United States Patent Office 3,787,513
Patented Jan. 22, 1974

3,787,513
ARYL SUBSTITUTED METHANE COMPOUNDS
Paul R. Stapp, Bartlesville, Okla., assignor to
Phillips Petroleum Company
No Drawing. Filed June 9, 1971, Ser. No. 151,587
Int. Cl. C07c 15/12
U.S. Cl. 260—668 C                7 Claims

ABSTRACT OF THE DISCLOSURE

Aryl substituted methane compounds are prepared by contacting an aromatic aldehyde with an aromatic hydrocarbon in the presence of boron trifluoride.

This invention relates to a novel method of preparing aryl substituted methane compounds by reacting aromatic compounds with aldehydes in the presence of a boron trifluoride catalyst.

Although alkylated aromatic compounds are well known, the prior art to date has not taught that an aromatic aldehyde will react with an aromatic compound in the presence of boron trifluoride to yield alkylated aromatic compounds. The uniqueness of the boron trifluoride catalyzed process is illustrated by the fact that another well-known Lewis acid, i.e., stannic chloride, does not catalyze similar reactions.

It has now been found that alkylated aromatic compounds can be prepared by contacting an aromatic aldehyde with an aromatic compound in the presence of boron trifluoride.

The reaction of an aromatic compound with an aromatic aldehyde within the scope of this invention can be represented by the following equation:

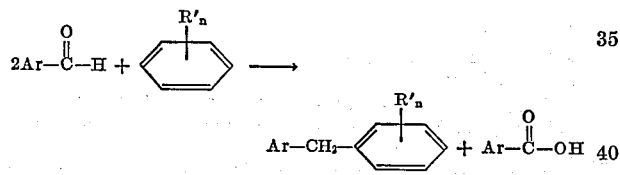

wherein Ar represents an aromatic hydrocarbon; R' represents either a halogen, hydrocarbyl or hydrocarbyloxy radical; and $n$ is an integer varying from 0 to 5. The aromatic aldehyde reactant contains at least 7 carbon atoms, and the aromatic reactant contains at least 6 carbon atoms. The Ar radical of aldehyde reactant may contain substituents selected from the group consisting of halogens, alkyl, cycloalkyl, aryl, alkoxy, cycloalkoxy, aryloxy, and combinations thereof, such as alkaryl, aralkyl, and aralkoxy.

The aldehydes which may be employed in the practice of this invention are aromatic aldehydes of organic compounds that contain at least one univalent aldehyde group

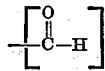

attached to an aromatic ring carbon atom.

Representative of aldehyde reactants falling within the above description are:

benzaldehyde;
4-methylbenzaldehyde;
3-isopropylbenzaldehyde;
2-chloro-4-butylbenzaldehyde;
4-bromooctylbenzaldehyde;
2-iodo-4,5-diethylbenzaldehyde;
2,5-dimethoxybenzaldehyde;
3,5-dibutoxybenzaldehyde;
4-phenoxybenzaldehyde;
1-naphthaldehyde;
2-naphthaldehyde;
4-chloro-1-naphthaldehyde;
8-methyl-5-butyl-1-naphthaldehyde;
4-methoxy-1-naphthaldehyde;
5-ethoxy-1-naphthaldehyde;
9-anthrocene carboxaldehyde.

The aromatic reactant compounds are any compounds that have at least one hydrogen atom attached to an aromatic ring carbon atom. The compounds may be mono or polycyclic, such as benzene, naphthalene, anthracene, etc., and can have substituents including halogen, alkyl, cycloalkyl, aryl, alkoxy, cycloalkoxy, aryloxy and combinations thereof. Representative aromatic compounds include:

toluene,
1-fluoro-2,4-diethylbenzene;
1,2,3-trimethylbenzene;
cyclohexylbenzene;
biphenyl;
1,2-dimethylnaphthalene;
4,5-diethylnaphthalene;
5,6-diethylacenaphthene;
indene;
anthracene;
chlorobenzene;
1,2-dichlorobenzene;
1,2-dibromobenzene;
1,4-diiodobenzene;
1,3,5-trichlorobenzene;
1-cyclohexyl-2,5-dichlorobenzene;
1-benzyl-2,5-dibromobenzene;
anisole;
8-decyloxynaphthalene;
1-dodecylanthracene;

and the like.

Catalytic amounts of boron-trifluoride can be added directly to the reactants in any form.

Suitable catalytic amounts vary from 0.2 to 100 moles of $BF_3$ per 100 moles of aldehyde reactant. Suitable forms include pure $BF_3$ or $BF_3$ etherate coordination compounds. The etherates can be made from $BF_3$ and any ether, such as dimethyl ether, diethyl ether, anisole, phenetole, etc. Any mole ratio of $BF_3$ to ether can be employed, including equal mole ratios.

The reactions of this invention can be carried out in the presence of diluents including aliphatic, alicyclic or aromatic hydrocarbons. Preferably the diluents are free of polar atoms or polar groups of atoms, i.e., oxygen, nitrogen, sulfur and combinations thereof, since the presence thereof reduces yield of diarylmethane.

The process of this invention can be carried out in any convenient manner including the admixture of the aromatic reactant and aldehyde compounds in the presence of boron trifluoride. Preferably the reaction conditions are such that the reaction mixture is maintained substantially in a liquid phase. The reactions can be carried out at any suitable temperature convenient to admixing the reactants and the catalyst. Suitable temperatures include those within the range of from 0° C. to 300° C. with a preferred range of from 50° C. to 150° C. The preferred reaction temperatures set out above reduce the occurrence of undesirable side reaction products. The reaction time can vary widely, however, a time period of from 1/10 of an hour to 24 hours, and preferentially from 4 to 10 hours, is desirable in order to optimize the ultimate yield.

The mole ratio of aldehyde to aromatic can vary widely. In general, 2 moles of aldehyde per mole of aromatic are employed, unless the aromatic compound is present not only as a reactant but also as a diluent. Any catalytic quantity of boron trifluoride can be employed. The mole ratio of $BF_3$ to aldehyde can vary widely. Suitable ratios include mole ratios varying from 500 moles aldehyde:1 mole $BF_3$ etherate to 1 mole aldehyde: 1 mole $BF_3$ etherate.

The following examples illustrate the practice of this invention.

EXAMPLE I

A 1-liter round bottomed flask fitted with a water-cooled reflux condenser and nitrogen inlet adapter was charged with a mixture of 200 g. (1.9 moles) benzaldehyde, 25 ml. (27.5 g., 0.19 mole) boron trifluoride etherate, and 400 ml. toluene. After a 48-hour reflux period under a nitrogen blanket, the mixture was washed with water and sodium carbonate solution. The organic phase was separated, dried over anhydrous magnesium sulfate, and distilled. After the toluene was distilled at atmospheric pressure, the pressure of the system was reduced to 18–20 mm. and the distillation was continued to give the following fractions.

| Temperature (° C.) | Pressure (mm.) | Component | Weight (g.) |
|---|---|---|---|
| 80–82 | 20 | Benzaldehyde | 127.3 |
| 160–164 | 18 | Phenyltolylmethanes | 51.1 |

This represents an 82 mole percent ultimate yield of phenyltolylmethanes based on benzaldehyde. The product was characterized by gas chromatographic and infrared analyses.

EXAMPLE II

A mixture of 200 g. (1.9 moles) of benzaldehyde, 400 ml. of benzene, and 25 ml. (27.5 g., 0.19 mole) of boron trifluoride etherate was refluxed under nitrogen for 48 hours. The reaction mixture was washed with water and sodium carbonate solution. The organic phase was separated, dried over anhydrous sodium sulfate and distilled at atmospheric pressure to remove unreacted benzene. Vacuum distillation of the residue at 20 mm. pressure gave 167.2 g. of benzaldehyde (78–80° C.) and 23.7 g. of diphenylmethane (139–142° C.). Acidification of the sodium carbonate solution used in the work-up above gave 18.6 g. of benzoic acid (M.P. 121–122° C.). These results represent ultimate yields of 91 mole percent and 98.5 mole percent, respectively, for diphenylmethane and benzoic acid based on benzaldehyde.

EXAMPLE III

A 1-liter round bottomed flask fitted with a water-cooled reflux condenser and nitrogen inlet adapter was charged with a mixture of 200 g. (1.9 moles) benzaldehyde, 20 ml. (44.5 g., 0.17 mole) stannic chloride, and 400 ml. benzene. After an 18 hour reflux under nitrogen, the cooled reaction mixture was poured over ice using ether to aid in the transfer. The organic layer was separated and washed successively with water and aqueous sodium carbonate before drying the organic phase over anhydrous magnesium sulfate. After removing the magnesium sulfate by filtration, benzene was distilled off at atmospheric pressure, and 190.4 g. benzaldehyde was recovered by distilling the residue at reduced pressure.

I claim:

1. A method of preparing an aryl substituted methane compound represented by the formula

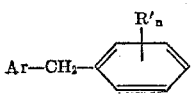

wherein Ar represents an aromatic hydrocarbon which may contain substituents selected from the group consisting of halogen, alkyl, cycloalkyl, aryl, alkoxy, cycloalkoxy, aryloxy, and combinations thereof; each R' independently represents a halogen, a hydrocarbyl or a hydrocarbyloxy radical, and $n$ is an integer in the range of 0 to 5; which comprises contacting an aromatic compound having at least one hydrogen atom attached to a ring carbon atom and represented by the formula

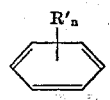

wherein R' and $n$ are as defined above, with an aromatic aldehyde represented by the formula

wherein Ar is as defined above, in the presence of a boron trifluoride catalyst under suitable reaction conditions to produce said aryl substituted methane compound, and recovering said aryl substituted methane compound as a product of the reaction.

2. A method in accordance with claim 1 wherein said boron trifluoride catalyst is present in etherate form.

3. A method in accordance with claim 1 wherein said suitable reaction conditions comprise a temperature in the range of about 0° C. to about 300° C., a reaction time in the range of about 1/10 hour to about 48 hours, and a molar ratio of said aldehyde to said boron trifluoride catalyst in the range of about 500:1 to about 1:1.

4. A method in accordance with claim 1 wherein said suitable reaction conditions comprise a temperature in the range of about 50° C. to about 150° C., and a reaction time in the range of about 4 to about 48 hours.

5. A method in accordance with claim 4 wherein said reaction is carried out in the presence of a diluent selected from the group consisting of aliphatic, alicyclic and aromatic hydrocarbons free of polar atoms and polar groups of atoms.

6. A method in accordance with claim 4 wherein said aldehyde is benzaldehyde, and wherein said aromatic compound is toluene.

7. A method in accordance with claim 4 wherein said aldehyde is benzaldehyde, and wherein said aromatic compound is benzene.

References Cited

UNITED STATES PATENTS

| | | | |
|---|---|---|---|
| 2,439,228 | 4/1948 | Sturrock et al. | 260—668 C |
| 2,848,509 | 8/1958 | Toland et al. | 260—668 C |
| 3,062,904 | 11/1962 | Koetitz et al. | 260—668 C |

OTHER REFERENCES

Lombard et al., Comptes Rendus, 239, pp. 887–888, Oct. 11, 1954.

McKenna et al., 59 J.A.C.S., 1204–5, July 1937.

Price et al., 60 J.A.C.S., 2499–2502, October 1938.

CURTIS R. DAVIS, Primary Examiner

U.S. Cl. X.R.

260—515 R